United States Patent [19]

Farrand et al.

[11] Patent Number: 5,444,849
[45] Date of Patent: Aug. 22, 1995

[54] METHOD FOR EXCHANGING LINK LEVEL MESSAGES BETWEEN A MANAGER FOR A COMPUTER SYSTEM AND A REMOTE FACILITY ASYNCHRONOUSLY LINKED THEREWITH

[75] Inventors: Scott C. Farrand, Tomball; Thomas J. Hernandez, Houston; Ronald A. Neyland, Spring; Richard A. Stupek; Andrew J. Miller, both of Houston; Patrick E. Dobyns, Garland; Stephen R. Johnson, Jr., Plano, all of Tex.

[73] Assignee: Compaq Computer Corporation, Houston, Tex.

[21] Appl. No.: 90,920

[22] Filed: Jul. 12, 1993

Related U.S. Application Data

[62] Division of Ser. No. 756,509, Sep. 9, 1991, Pat. No. 5,257,384.

[51] Int. Cl.⁶ ............................................. G06F 13/14
[52] U.S. Cl. .................... 395/200.09; 364/240.8; 364/241; 364/241.8; 364/DIG. 1; 395/725
[58] Field of Search ............... 395/200, 325, 725, 680, 395/275; 370/35, 60, 17

[56] References Cited

U.S. PATENT DOCUMENTS

| | | | |
|---|---|---|---|
| 4,493,021 | 1/1985 | Agrawal | 395/200 |
| 4,530,051 | 7/1985 | Johnson et al. | 395/200 |
| 4,569,044 | 2/1986 | Tao et al. | 370/85 |
| 4,791,566 | 12/1988 | Sudama et al. | 395/325 |
| 4,914,653 | 4/1990 | Bishop et al. | 370/85.6 |
| 4,937,737 | 6/1990 | Schwane et al. | 395/650 |
| 4,947,317 | 8/1990 | DiGiulio et al. | 395/325 |
| 4,970,714 | 11/1990 | Chen et al. | 370/17 |
| 5,056,003 | 10/1991 | Hammer et al. | 395/650 |
| 5,062,037 | 10/1991 | Shorter et al. | 395/325 |
| 5,062,040 | 10/1991 | Bishop et al. | 395/650 |
| 5,062,046 | 10/1991 | Sumiyoshi et al. | 395/650 |
| 5,086,498 | 2/1992 | Tanaka | 395/200 |
| 5,088,032 | 2/1992 | Bosack | 395/200 |
| 5,109,515 | 4/1992 | Laggis et al. | 395/725 |
| 5,113,498 | 3/1992 | Evan et al. | 395/275 |
| 5,123,090 | 6/1992 | Komatsu et al. | 395/200 |
| 5,124,943 | 6/1992 | Lubarsky | 395/200 |
| 5,127,087 | 6/1992 | Kasiraj et al. | 395/200 |
| 5,128,930 | 7/1992 | Nazarenko et al. | 370/60 |
| 5,130,983 | 7/1992 | Heffner, III | 370/85.8 |
| 5,133,053 | 7/1992 | Johnson et al. | 395/200 |
| 5,142,683 | 8/1992 | Burkhardt, Jr. et al. | 395/725 |

Primary Examiner—Christopher B. Shin
Attorney, Agent, or Firm—Konneker & Bush

[57] ABSTRACT

A protocol for communicating messages between a manager for a computer system and a remote facility asynchronously connected with the system manager and a method for exchanging messages using the protocol. The protocol determines whether the system manager is ready to exchange messages with the remote facility, determines whether the remote facility is ready to exchange messages with the system manager and exchanges messages between the system manager and the remote facility. To exchange messages, a command message which includes a first field for identifying a command transmitted by the command message and a second field for identifying the command message is transmitted. In response, a command reply message which includes a first field for identifying the command to which the command reply message is in response to, a second field for matching the command response message to the command message and a third field for transmitting a response to the command message is transmitted.

9 Claims, 5 Drawing Sheets

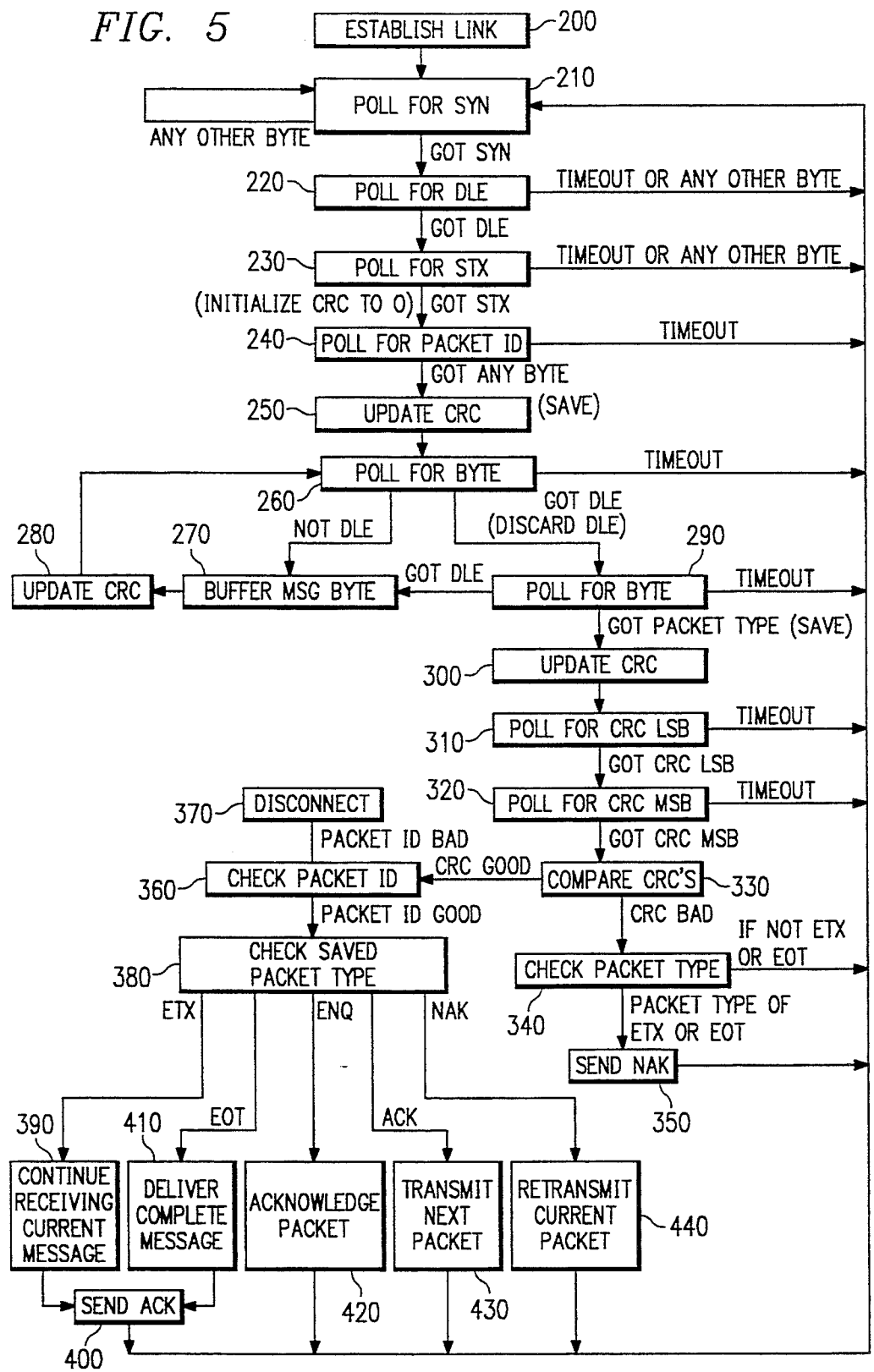

METHOD FOR EXCHANGING LINK LEVEL MESSAGES BETWEEN A MANAGER FOR A COMPUTER SYSTEM AND A REMOTE FACILITY ASYNCHRONOUSLY LINKED THEREWITH

This is a division of application Ser. No. 07/756,509, filed Sep. 9, 1991, now U.S. Pat. No. 5,257,384.

CROSS REFERENCE TO RELATED APPLICATIONS

This application is related to U.S. patent application Ser. Nos. 07/720,259 entitled COMPUTER SYSTEM MANAGER, now abandoned, 07/719,240 entitled INNATE BUS MONITORING SYSTEM FOR COMPUTER SYSTEM MANAGER, now U.S. Pat. No. 5,402,431, 07/720,258 entitled IN-BAND/OUT-OF-BAND ALERT DELIVERY SYSTEM, 07/719,243 entitled REMOTE CONSOLE EMULATOR FOR COMPUTER SYSTEM MANAGER, and 07/719,394 entitled POWER SUPPLY FOR COMPUTER SYSTEM MANAGER, now U.S. Pat. No. 5,283,905 all of which were filed on Jun. 24, 1991, assigned to the assignee of the present invention and hereby incorporated by reference as if reproduced in their entirety.

This application is further related to U.S. patent application Ser. Nos. 07/756,506 entitled REMOTE SYSTEM REBOOT, now U.S. Pat. No. 5,410,706, 07/757,066 entitled POWER SUPPLY FOR COMPUTER SYSTEM MANAGER, now U.S. Pat. No. 5,272,382, 07/756,488 entitled NETWORK PROTOCOL FOR COMPUTER SYSTEM MANAGER, now U.S. Pat. No. 5,309,563 all of which were filed on even date herewith, assigned to the assignee of the present invention and hereby incorporated by reference as if reproduced in their entirety.

BACKGROUND OF THE INVENTION

1. Field of the Invention

The invention relates to a system manager for a computer system, and, more particularly, to a protocol for asynchronous data transfers between a remote or out-of-band local system manager facility and the system manager.

2. Description of Related Art

The desire to share computer resources has motivated the development and continuing improvement of computer networks. One such computer network is generally referred to as a local area network (or "LAN"). A LAN is a system of computer hardware and software that links components such as computers, printers and other peripherals into a network suitable for transmission between various ones of the linked components located in relative proximity to each other, for example in different offices in a building, or in different buildings situated near one another. Similar to a LAN is a wide area network (or "WAN"). A WAN differs from a LAN in that a telephone network is also required to link at least some of the components included in the network to the remainder of the network components.

Various types of network operating systems are in existence today. They include the NetWare system manufactured by Novell, Inc. of Provo, Utah, the VINES system manufactured by Banyan, and the LAN Manager system manufactured by Microsoft Corporation of Redmond, Wash. While such network operating systems often include a network manager, the network manager included in such systems have typically relies upon the network operating system to provide data to the network manager for performing network management functions. Since network managers have been forced to rely upon data transmitted by the network, prior network managers have focussed on analyzing the health of the network and have not been particularly well suited to analyze the health of the components of the network.

Thus, of the five functional areas of network management (configuration, fault analysis, accounting, performance and security) recognized by the OSI/Network Management Forum, network managers have been best equipped to performing configuration and security management. Network managers can also provide limited fault analysis, but, in most cases, only after failure has occurred. Recently, the development of larger networks, both LAN and WAN, which include multiple printer, communication, database, and file server locations have been contemplated. This drive towards combining increasing numbers of computer components into a single network, has led to an increased demand for greater management capabilities. While, in the past, failure alerts may have been satisfactory, there is an increasing demand for information that will lead to failure whereby potential failures may be reported in sufficient time to allow for corrective action before an actual failure occurs. In addition to this increased demand for information that will lead to failure, the capability of real-time analysis of the performance of a computer system is also seen as a highly desirable management capability, particularly in the development of larger, multiple file server networks which will challenge minicomputers and mainframes for larger scale applications. Furthermore, as many of such networks will utilize a WAN configuration, the need to be able to manage the network from a remote or out-of-band local system facility is of increased importance. Total reliance on local management capabilities would be a significant detriment to such systems since at least one major component of the systems would likely be remotely located with respect to the remainder of the system, thereby producing a network unable to manage the entire system from a single management console or facility.

To provide flexibility in system configuration, it would often be desirable to provide for a remote or out-of-band local system manager facility to control the system manager board. To provide this capability to manage the network from a remote or out-of-band local system facility, an asynchronous communication link between the system manager and the system facility will be required. In order to achieve such a link, a common set of conventions (or "protocol") for communications between the two must be provided. Furthermore, in view of the complex communications anticipated during facility control of the system manager, the asynchronous protocol utilized therewith must enjoy considerable flexibility in use.

The framework used to configure most protocols such as the asynchronous protocol disclosed herein has been established by the International Standards Organizations (or "ISO") and referred to as the ISO model for Open Systems Interconnection (or "OSI"). This model identifies seven (7) distinct levels, or layers, of functional requirements pertaining to a data communications network. Each layer (i) performs a related subset of the functions required to communicate with another system; (ii) relies on the next lower layer to perform more primitive functions and to conceal the details of those functions; and (iii) provides services for the next higher layer.

The OSI layers consist of (1) the physical layer which governs the physical interface between devices and the rules by which bits are passed from one to another; (2) the data link layer which attempts to make the physical link reliable, i.e. error-free, and provides the means to activate, maintain and deactivate the link; (3) the network layer which is responsible for establishing, maintaining, and terminating connections across an intervening communications facility; (4) the transport layer which insures that data units are delivered error-free, in sequence and without losses or duplications; (5) the session layer which provides means for two application processes to establish and use a connection, called a session; (6) the presentation layer which resolves differences in the syntax (representation) of the data exchanged between application entities and provides for the selection and subsequent modification of the syntax to be used; and (7) the application layer which contains management functions and other useful mechanisms to support distributed applications.

The OSI layers are defined so that changes in one layer do not require changes in the other layers. Communication is achieved by having corresponding or "peer" entities in the same layer in two different systems communicate via a protocol. A protocol is a set of rules governing a time sequence of events that take place between peer entities; that is, between equipment or layers on the same level.

The most common way in which protocols are realized is with the use of a header. When a first application has data to send to a second application, the transfers those data to an application entity in the application layer. A header is appended to the data that contains the required information for the peer entity. The original data, plus the header, is now passed as a unit to the presentation layer. The presentation entity treats the whole unit as data, and appends its owns header. This process continues down through the link layer, which generally adds both a header and a trailer. This link layer unit, called a frame, is then passed by the physical layer onto the transmission medium. When the frame is received by the target system, the reverse process occurs. As the data ascends, each layer strips off the outermost header, acts on the protocol information contained therein, and passes the remainder up to the next layer.

SUMMARY OF THE INVENTION

The present invention is of a protocol for communicating messages between a manager for a computer system and a remote facility asynchronously connected with the system manager and a method for exchanging messages using the protocol. The protocol comprises means for determining whether the system manager is ready to exchange messages with the remote facility, means for determining whether the remote facility is ready to exchange messages with the system manager, and means for exchanging messages between the system manager and the remote facility. The means for exchanging messages includes means for transmitting a command message which includes a first field for identifying a command transmitted by the command message and a second field for identifying the command message, means for transmitting a command replay message which includes a first field for identifying the command to which the command reply message is in response to, a second field for matching the command response message to the command message and a third field for transmitting a response to the command message.

In one aspect of this embodiment of the invention the means for transmitting a command replay message may further include means for generating the first field of the command replay message to be a variant of the first field of the command message such that the first field of the command reply message identifies the transmitted command and the third field is a response to the transmitted command. The protocol of this embodiment of the invention may transmit command messages from the system manager to the remote facility such that the remote facility transmits command message responses to the system manager or may transmit command messages from the remote facility to the system manager such that the system manager transmits command message responses to the remote facility. Among the command messages which may be transferred in this manner are screen orientated information, commands which support system manager or remote facility activity, commands which insert alerts into the communication stream and commands which perform object management.

BRIEF DESCRIPTION OF THE DRAWINGS

The invention may be better understood and its numerous objects, features and advantages become apparent to those skilled in the art by referencing the accompanying drawing in which:

FIG. 5 is a flow chart which illustrates the asynchronous protocol subject of the present invention.

DETAILED DESCRIPTION OF A PREFERRED EMBODIMENT

Figure 1:
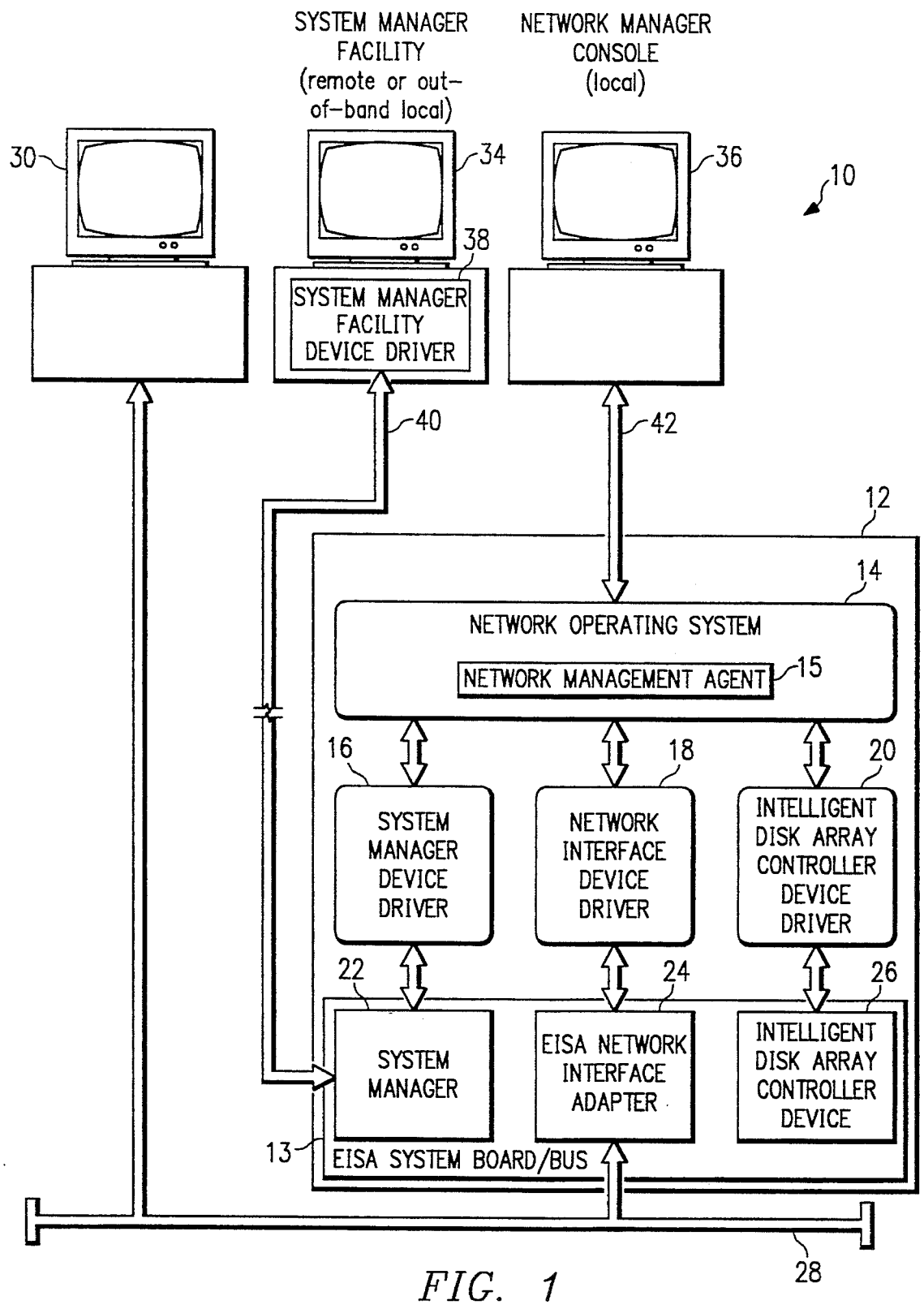
FIG. 1 is a block diagram of a computer network having an EISA based computer system and a computer system manager installed therein.

Referring first to FIG. 1, an extended industry standard architecture (or "EISA") based computer network 10 having a system manager 22 shall now be described in detail. The computer network 10, which may be configured as either a LAN, WAN, or other type of network configuration, includes an EISA server 12, for example, a Systempro Model 486-840 manufactured by Compaq Computer Corp. of Houston, Tex., having an EISA based computer system board comprised of a series of computer subsystems (not shown) interconnected by a EISA based system bus. As the computer subsystems themselves are not specifically illustrated herein, the EISA computer system board and EISA system bus are, for ease of illustration, indicated as a unified element, EISA system board/bus 13, although all specific references to such element shall specifically indicate which portion of the unified element is being considered in such reference.

Installed on the EISA computer system board 13 are a plurality of cards which include the system manager 22, which, as will be more fully described below, is comprised of a 32 bit intelligent bus master board and supporting firmware, an EISA network interface adapter 24 and an intelligent disk array controller device 26. Installed in the operating system (or "OS") section of the EISA server 12 is a network operating system 14, preferably one which includes a network management agent 15. It is contemplated that any one of numerous network operating systems, for example, the NetWare or LAN Manager network operating systems previously described, would be suitable for use as the network operating system 14.

Interfacing the system manager 22 and the network operating system 14 is a system manager device driver 16. The system manager device driver 16 acts as a bi-directional translator for all requests to and from the system manager 22, thereby providing two-way communication between the system manager 22 and the network management agent 15. Through this interconnection between the system manager 22 and the network management agent 15, the network management agent 15 may supply information to or receive information collected by the system manager 22. Object management by the system manager 22 may, therefore, be initiated by the network management agent 15 if the network management agent 15 issues instructions to create, delete, modify, reset, or clear objects stored in the system manager 22.

The system manager device driver 16 will also handle certain in-band and out-of band alerts. If generated by the system manager 22, an in-band alert will be transmitted by the system manager device driver 16 to the network operating system 14 which, under the control of the network management agent 15, will direct the in-band alert to a local network manager console 36 connected to the network operating system 14 by in-band network bus 42. Out-of-band alerts generated by the network operating system 14, on the other hand, will be transmitted by the system manager device driver 16 to the system manager 22 for transmission to a remotely located system manager facility 34 connected to the system manager 22 via an asynchronous link 40, for example, a telephone connection. Two-way communication between the system manager 22 and the remotely located system manager console is provided by a system manager facility device driver 34. While there are additional signals transmitted between the system manager 22 and the network operating system 14 by the system manager device driver 16, these additional signals shall be discussed in greater detail later.

The network management agent 15 also operates as a central collection point for network management information for the EISA server 12 by acting as a link between the system manager 22, other cards installed on the computer system board 13, and the computer network itself. For example, in the embodiment of the invention illustrated in FIG. 1, an EISA network interface adapter 24, for example, a Model NE3200 32bit Ethernet adapter manufactured by Anthem Electronics, Inc., and an intelligent disk array controller device 26, are also installed on the computer system board 13. The network operating system 14 connects the computer system board 13 and, via a network interface device driver 18 which operates in a manner similar to the system manager device driver 16, the network interface adapter 24 for two-way date transmission therebetween. Furthermore, as the network interface adapter 24 is connected for two-way data transmission with the network 28, a two-way communication link between the system manager 22 and the network 28 is thusly provided. The network 28 is the interface of the network components via the network media. The network 28 may be configured in a Token Ring, Ethernet, or other network topology in use today, to control the access of multiple computer stations to the network 28, although, in the embodiment of the invention described and illustrated herein, a single computer station 30 has been provided.

An intelligent disk array controller device driver 20 which, like the network interface device driver 18, operates in a manner similar to the system manager device driver 16, provides for two-way data transmission between the system manager 22 and, via the network operating system, the intelligent disk array controller device 26. The intelligent disk array controller device 26 provides disk storage for the computer system board 13. For example, it is contemplated that the intelligent disk array (or "IDA") controller device 26 may provide 840 Mbytes of disk storage for the computer system board 13 by associating four 210M-byte Compaq IDA drive pairs therewith.

Figure 2:
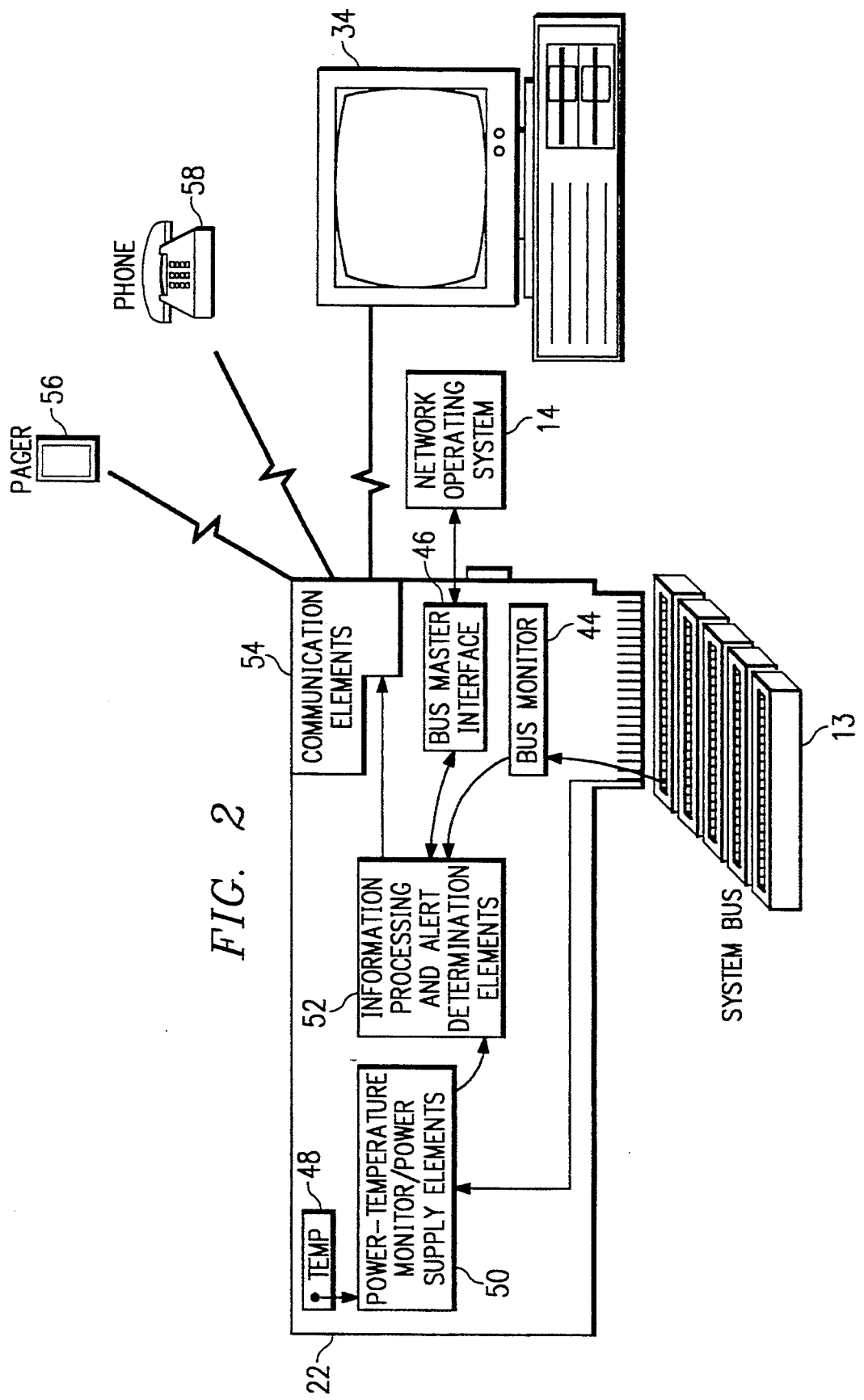
FIG. 2 is a block diagram of the system manager of FIG. 1 which illustrates information flow to and from, as well as within, the system manager.

Referring next to FIG. 2, the flow of information, most commonly in the form of data and alerts, to and from, as well as within the system manager 22 shall now be described in greater detail. As will be more fully described below, the system manager 22 has the ability to monitor various system components and parameters. If a component experiences a failure or exhibits characteristics that indicate it may experience a failure, the system manager 22 detects the failure or characteristic indicative of a potential failure and reports the failure or characteristic indicative of a potential failure as an alert in a manner such that corrective action can be taken.

As may be seen in FIG. 2, the path by which data accumulated during the monitoring of system components and parameters indicative of an actual or potential failure may be any one of four paths, depending on the particular type of actual or potential failure being monitored. Each system component being monitored may be referred to as an object having a number of attributes. As the components continue to be monitored, the value of the object's attributes may change, for example, by incrementing, decrementing, updating, resetting or modifying. When the attributes exceed their boundary or threshold value, an alert will be generated. In addition to alerts, the attributes of objects may be utilized to provide continuous real-time monitoring of the computer system board 13 without interfering with normal system operations.

Addressing the specific signals being monitored by the system bus manager 22, the computer system bus 13 supplies certain signals to a bus monitor 44 which will help determine the state of the computer system board 13. These signals include interrupt request (or "IRQ") signals, data memory request (or "DRQ") signals and input/output (or "I/O") signals. In one embodiment of the invention, it is contemplated that the bus monitor 44 monitors the I/O signals although, in a further embodiment of the invention, it is contemplated that the bus monitor 44 monitors the supplied IRQ, DRQ and I/O signals. If the signals are active, then the corresponding system resources are being used. In this manner, these signals may be used to monitor the performance of the computer system board 13. Other signals supplied by the computer system bus 13, are utilized during object management to indicate alert conditions. For example, the absence of the refresh signal will generate an alert since the lack of refresh may cause the file server 12 to fail. Similarly, an indication of a memory parity error will cause the generation of an alert. Also innately monitored by the bus monitor 44 are the printer port, so that the system manager 22 can report whether or not there is a printer error or is out of paper, the asynchronous serial port, so that the system manager can monitor and log asynchronous activity such as overrun errors, parity errors, and framing errors for system board serial ports, system software, so that software errors can be identified, and keyboard events, so that keystrokes can be logged and the relationship between a system failure and keyboard inputs can be analyzed. Finally, the bus monitor 44 will detect the assertion of IOCHK, indicative of a catastrophic board failure, and board "times out", indicative of a violation of EISA standards. The bus monitor 44 transfers these signals to information processing and alert determination elements 52 where the monitored information is processed. As will be more fully described below, the information processing and alert determination elements 52 of the system manager 22 is comprised of a control processor and supporting logic which, by the application of object management techniques, is configured to determine whether the monitored information warrants the generation of an alert.

The system manager 22 further provides for the monitoring of other signals for delivery to the information processing and alert determination elements 52 for potential generation of alerts. These other signals are supplied to the information processing and alert determination elements 52 by a path distinct from that previously discussed. To power the system manager 22, the computer system bus 13 provides ±5 Volt and ±12 Volt lines to a power-temperature monitor/power supply elements 50. The level of voltage supplied to the system manager 22 is converted into a digital signal by an analog-to-digital converter included in the power-temperature monitor/power supply elements 50 and the digital power level signal is provided to the information processing and alert determination elements 52. For example, if a drop in system power is detected, the information processing and alert determination elements 52 will generate an alert. If, however, a complete loss of power occurs, the system manager 22 will switch to battery power and the event reported, again as an alert, through one or both of its asynchronous modem and serial connections. This aspect of the system manager 22 is more fully described in co-pending patent application Ser. No. 07/719,394 entitled "Power Supply for a Computer System Manager" and previously incorporated by reference. Briefly, however, after loss of system power, the system manager will switch into reserve power to deliver alerts and, after completing alert delivery, to standby mode to conserve power. After reserve power is exhausted, the system manager then switches into dormant mode to keep its RAM memory valid for an extended period of time and, after the expiration of the extended period of time, cutting power off completely.

The system manager 22 is further provided with a temperature sensor 48. The internal temperature of the system manager 22 is continuously monitored by the temperature sensor 48 and the measured temperature transmitted to power-temperature monitor/power supply elements 50 where analog to digital conversion of the monitored temperature is performed. The digital temperature level is then transmitted to information processing and alert determination elements 52 for object management. If the information processing and alert determination elements 52 determine that the temperature has risen above a predetermined threshold, then an alert may be issued.

Finally, a bus master interface 46 is used to transfer certain signals from the network operating system 14 to the information processing and alert determination elements 52. Typically, the information provided by the bus master interface 46 differs from that passively supplied by the bus monitor 44 or the power-temperature monitor/power supply elements 50 in that information supplied via the bus master interface 46 are supplied as hard inputs. However, by interfacing with network operating system 14, the system manager 22 can monitor network resources other than the computer system board 13 itself. For example, in a typical network management system, the intelligent disk array controller device 26 would provide management information to the network management agent 15 such as the number of read errors that have occurred. In turn, the network management agent 15 can provide that information to the system manager 22 via the bus master interface 46.

The information passively monitored by the bus monitor 44 and the power-temperature monitor portion of the power-temperature monitor/power supply elements 50 and supplied to the information processing and alert determination elements 52, as well as that information supplied to the information processing and alert determination elements 52 by the bus master interface 46 may be used for several purposes. First, the information processing and alert determination elements 52 can process the information and, if appropriate, generate an alert. Examples of alert conditions that may be determined by information processing and alert determination elements 52 include loss of system power, server subsystem failure, excessive server temperature as well as other configurable events that require outside attention.

Once the information processing and alert determination elements 52 determine that an alert should be issued, such an alert can be issued in a number of ways. Initially, it must be determined if the alert should be delivered "in-band" or "out-of-band". Once originated by the information processing and alert determination elements 52, an in-band alert is directed to the bus master interface 46 and on to the network operating system 14 and, under the control of the network management software contained in the network management agent 15, on to the local network manager console 36. So that the use of existing network hardware is maximized, it is contemplated that in-band alerts to the local network manager console 36 will be utilized as the primary path for communications with the system manager 22. It should be specifically noted, however, that, a local system manager console may be used to receive in-band alerts without departing from the practice of the present invention. If the information processing and alert determination elements 52 determine that the alert should be issued "out-of-band", the alert is transmitted to communication elements 54 where an alert is issued. As is more fully described in co-pending U.S. patent application Ser. No. 07/720,258 entitled "In-band/Out-of-band Alert Delivery System" and previously incorporated by reference, the communication elements may send an out-of-band alert by sending a protocol message over a switched telephone connection to the system manager facility 34, by dialing a phone number associated with a pager 56 or by dialing a phone number to a phone 58 associated with a person and generating a synthesized voice message upon completing a connection with the phone 58.

In addition to alert determination and generation based upon the passively monitored information, the information processing and alert determination elements 52 also perform several other functions. More specifically, the received information is also time stamped and stored or "logged" into RAM memory for later access. Thus, in the event of a catastrophic failure of the file server 12, the monitored and logged information will be available for "post mortem" diagnostics. Similarly, network information may be transferred over the bus master interface 46 and logged into RAM memory contained within the information processing and alert determination elements 52. Finally, the objects can be transferred, for example to the remote system manager facility 34 or the local network manager console 36 to provide real-time information regarding the performance of the system manager 22.

Through the link between the communications elements 54 of the system manager 22 and the system manager facility 34, significant control of the system manager 22 can be performed from a remote location. From the system manager facility 34, remote console emulation, access to stored data and remote control or "re-booting" may be performed. Remote console emulation or "hard key insertion" permits keystrokes at the remote console to be delivered to the system manager 22 as if they were input locally. Through the hard key insertion, "soft" reboots are emulated by simultaneously inserting "control"—"alt"—"del" to actuate a reboot of the system manager 22. While not being able to actuate a complete "hard" reboot, the system manager facility 34 can simulate a hard reboot. More information regarding remote console emulation is set forth in co-pending U.S. patent application Ser. No. 07/719,243 entitled "Remote Console Emulator for a Computer System Manager" and previously incorporated by reference.

Figure 3:
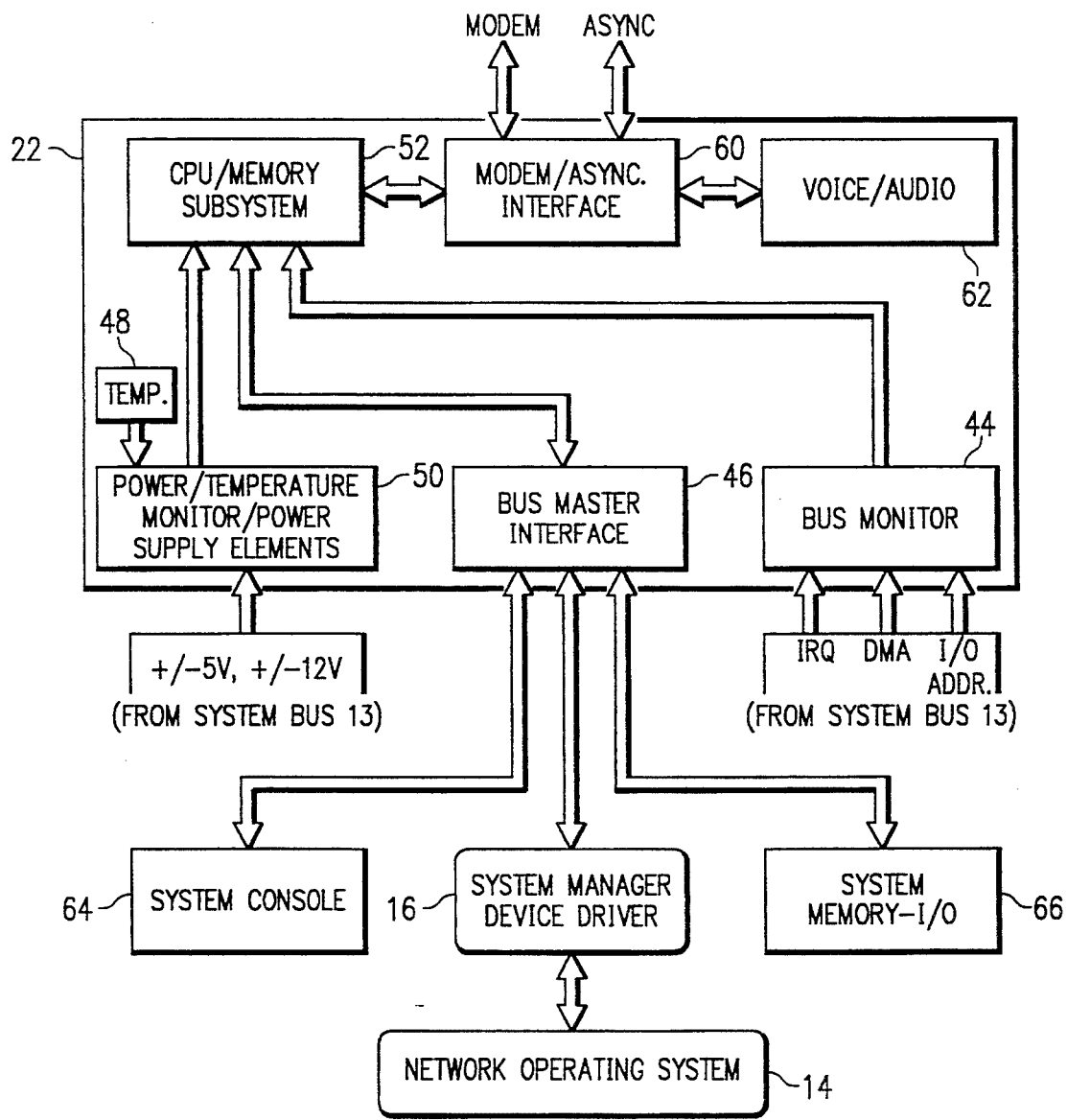
FIG. 3 is a top level block diagram of the system manager of FIGS. 1–2

Referring next to FIG. 3, the structural configuration of the system manager 22 shall now be described in greater detail. While quite similar to FIG. 2, certain elements of the system manager 22 have now been redesignated to more closely describe their structural configurations whereas, in FIG. 2, such elements were designated with their operational characteristics closer in mind. As may be better seen in FIG. 3, the bus monitor 44 innately monitors a plurality of signals relating to the state of the computer system board 13. Innate monitoring is accomplished by the bus monitor 44 receiving all data and address signals being transferred along the system bus 13. The bus monitor 44 will then select those signals which will help determine the state of the computer system board 13 and directs the selected signals via a bus to, what previously was functionally designated as the information processing and alert determination elements 52 and what is now structurally designated as a CUP/memory subsystem 52 which is the hardware which, together with associated firmware, will perform the aforementioned information processing and alert determination functions. Other signals, indicated here as miscellaneous system signals, are always considered to help determine the state of the computer system board and are directed through the bus monitor 44 to the CPU/memory subsystem 52. Additionally, the system bus 13 supplies power to the system manager 22 via ±5 V, ±12 V lines to the power-temperature monitor/power supply element 50 and on to the CPU/memory subsystem 52. In the event of that the supply of power from the system bus 13 is terminated, the power-temperature monitor/power supply element 50 will begin supplying power from a battery included therein. The termination of the supply of power from the system bus will also be reported to the CPU/memory subsystem 52 as an alert condition.

Connected to output of the CPU/memory subsystem is a modem/asynchronous interface 60 represents the two paths along which an out-of-band alert may be transmitted, via an asynchronous communication port or via a modem, in the event that an alert condition has been established. Alert conditions include loss of system power, server subsystem failure, excessive server temperature as well as out of other events which require the attention of the system manager facility 34. Either of these may be used to report an alert condition, although the modem would typically contact either one of the pager 56 of the phone 58 while the asynchronous communication port would typically contact a remote system manager, for example the system manager facility 34 illustrated in FIG. 2. Servicing the modem/asynchronous interface 60 is voice/audio elements 62. In the event that a voice alert is selected, the voice audio elements generate the voice alert which is then transferred to a phone 58 via the modem. Finally, in the system manager configuration illustrated herein, a local system manager console 64 and system memory I/O support the system manager 22 and are accessible via the bus master interface 46.

Figure 4:
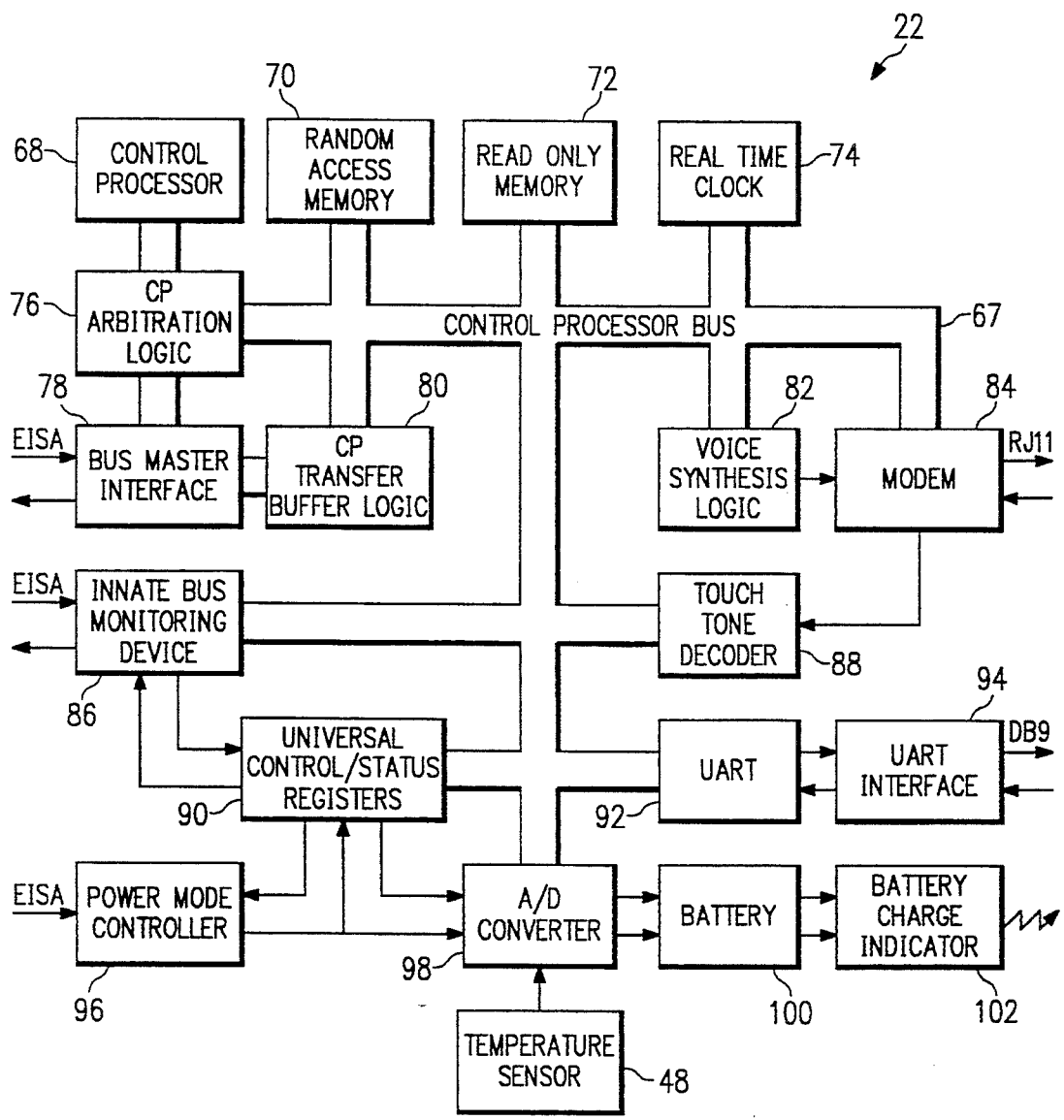
FIG. 4 is a low level block diagram of the system manager of FIG. 3.

Referring next to FIG. 4 the system manager 22 shall now be described in still greater detail. The system manager 22 is comprised of a bi-directional control processor bus 67 and a series of system manager components connected to the control processor bus 67 for the transfer of address, data and control signals between various components of the system manager 22. Connected to the control processor bus 67 are a control processor 68, random access memory 70, read only memory 72, a real time clock 74, control processor arbitration logic 76, a bus master interface 78, control processor transfer buffer logic 80, voice synthesis logic 82, a modem 84, a innate bus monitoring device 86, a touch tone decoder 88, universal control/status registers 90, a universal asynchronous receiver transmitter (or "UART") 92, a UART interface 94, a power mode controller 96, an analog-to-digital converter 98; and indirectly a battery 100 and a battery charge indicator 102 and a temperature sensor 48.

The various operations performed by the system manager 22 and the various system manager components 48 and 68–102 which are utilized to perform such operations shall now be described in greater detail. In the embodiment of the invention disclosed herein, the control processor 68 is a 16 bit microprocessor which operates at 16 MHz, although, in alternate embodiments of the invention, other microprocessor types will be suitable for use. The control processor 68 performs multiple tasks, including a primary task of collecting and storing information received from multiple sources and detecting failures based upon acquired data and issue alerts as appropriate. The control processor 68 also performs several other tasks which will be described in greater detail later. In its primary task, object data which is processed by the control processor 68 is stored in the random access memory 70 and processor instructions are stored in the read only memory 72. Depending on the particular object management performed on a particular system component, data from the computer system bus 13 and innately monitored by the innate bus monitoring device 86 may be operated on by the control processor 68 and the resultant object stored in the random access memory 70 or, depending on the particular object being managed, may be directly stored into the random access memory 70. Similarly, temperature and/or power data transmitted by the A/D converter 98 may be operated on by the control processor 68 and the result stored in the random access memory 70 or may be directly stored into the random access memory 70. The real time clock is a clock independent of the system clock which is configured to store date, time, year and other time related variables relating to objects, depending on user preference.

In "normal" operation, the control processor 68 controls the control processor bus 67 to provide data transfers between the control processor 68, the random access memory 70, the read only memory 72 and the real time clock 74. In normal operation, the control processor 68 performs object management as set forth in detail elsewhere. Based upon the acquired data, object management will provide for the detection of failures of the file server 12 or subsystems thereof.

The bus master interface 78 which, for example, may be an Intel 82355 BMIC, is configured to interrogate and modify the memory and I/O space 66 of the computer system 13 as well as the random access memory 70 of the system manager 22. For example, during a "data transfer operation" involving the system manager 22, the control processor arbitration logic 76 instructs the control processor bus 67 regarding the address, direction and destination of the data transfer. The control processor arbitration logic 76 then instructs the bus master interface 78 as to the transfer. Once the system manager 22 is ready for a transfer, the bus master interface 78 will then instruct the computer system bus 13 to arrange for a burst transfer of data to the bus master interface 78 which, in turn, will transfer the data, to the control processor transfer buffer logic 80 and on to the random access memory 70 for storage. Transfer of data from the random access memory 70 to the bus master interface 78 is accomplished in reverse manner.

Once, object management within the control processor 68 has indicated that an alert should be generated, the control processor 68 controls the delivery of the appropriate alert message via the modem 84, the UART 92 and/or the network operating system 15. The UART 92 provides an asynchronous interface between the system manager 22 and the system manager facility 34. Through a software interface provided between the UART 92 and the system manager facility 34, for example, by use of the Windows software, the system manager facility 34 is capable of reading monitored object values from and writing object control to the system manager 22. Likewise, video screen data can be transmitted from the system manager 22 to the remote console and keystrokes can be transmitted from the system manager facility 34 to the system manager 22. The system manager facility 34 also keeps alert logs. Finally, another function of the UART 92 is to connect an external modem to deliver page alerts under the control of the control processor 68.

As previously mentioned, alerts delivered to the pager 54 or the phone 56 are made via the modem 84 under the control of the control processor 68. When, however, an alert message is delivered to the phone 56, the voice synthesis logic 82 is utilized by the control processor 68 in order to generate an audible, voice alert. Pre-recorded voice messages are stored within the voice synthesis logic 82. These voice messages, which are stored in accordance with adaptive differential pulse code modulation, relate to a multitude of messages which may be accessed by the control processor and transmitted. For example, dates, numbers, alert conditions, names, voltages which correspond to the information useful to identify the type, severity, time of, location, or other identifying information regarding alert conditions. Thus, if the control processor desired to transmit a voice alert, the control processor 68 would instruct the voice synthetic logic 82 to supply the selected message to the modem 84, which, for example may be a 2400 bit per second modem, can transmit the selected message over its two way interface with the phone 58. After the alert has been transmitted, the modem 84 will await a return call through which it will pass sever information and control.

The touch tone decoder 88 is connected to accept analog signals from the modem 84. The touch tone decoder 88 decodes signals received by the modem and informs the control processor as to the nature of the signal. Most commonly, the touch tone decoder will be used to provide security for the system manager 22. For example, when a alert delivery is sent via the modem 84 to a pager 56 or a phone, a user receiving the alert will, in many situations, desire to contact the system manager 22 for additional information. For example, if the user transmits a password to the modem 84, the touch tone decoder 88 will decode the tones and transmit the decoded tones to the control processor 68. The control processor 68 then decides whether the password is legitimate. As will be more fully described in co-pending application Ser. No. 07/719,243, entitled "Remote Console Emulator for System Bus Manager", and previously incorporated by reference, the touch tone decoder 88 is also utilized in connection with remote console emulation operations. The power mode controller 92 both controls the power for the system manager 22 and monitors the power level for the system board. In a manner more fully described in co-pending application Ser. No. 07/719,394, entitled "Power Supply Controller for Computer System Manger", and previously incorporated by reference, the power mode controller will control the operation of the system manager 22 by designating which of alternate power modes the system manager 22, or in accordance with the requirements of certain power modes, which components of the system manager 22 are to be supplied power. In the event that power from the system bus 13 is unavailable, the battery 100 shall supply power to either the system manager 22 or to selected components thereof. As the battery 100 is rechargeable, the battery charge indicator 102 is provided to indicate when the battery 100 is being recharged. For example, the power mode controller 92 will cause the system manager 22 to activate the battery 100 should the supply voltage needed to operate the system manager 22 fall below a minimum operating voltage. The power mode controller 92 will also turn on and off devices not needed during operation of the battery 100. This circuitry will provide the best use of the battery 100 in this low power mode. After the processor delivers an alert, the power mode controller 92 will turn off the power to the control processor 68. The processor will be restarted when a call is detected, UART activity, expiration of set interval in real time clock and other system activity or subsystem activity.

Simultaneous, two-way asynchronous communications between the system manager 22 and the remote or out-of-band local system manager facility 34 via the UART 92 may be performed at two communication levels: link level and application level. As previously discussed, link level communications are performed by transferring formatted data packets across the link. More specifically, each data packet is formatted in accordance with the link level protocol for the system manager 22. This link level protocol for transferring data packets is as follows:

TABLE I

| |
|---|
| SYN [16h] (byte) |
| DLE [10h] (byte) |
| STX [02h] (byte) |
| Packet ID (byte) |
| Variable Length Data |
| DLE [10h] (byte) |
| Packet Type (byte) |
| CRC LSB (byte) |
| CRC MSB (byte) | where:

SYN (or "synchronous idle") is a one byte character code "16h" used to identify the start of a data packet;

DLE (or "data link escape") is a one byte character code "10h" used to identify all other characters reserved for data packet communications;

STX (or "start of text") is a one byte character code "02h" used to identify the start of valid command data;

Packet ID is a one byte identifier assigned by the sender to each data and attention packet. The packet ID can range from 0–FFh and are assigned sequentially. Once FFh packet IDs are assigned, the packet ID is wrapped back to zero. As to be more fully discussed below, the packet ID is initially set by the attention packet;

Variable Length Data is the actual data representing the command being passed. In addition to data characters, the variable length data field may also include DLE characters for the reasons set forth in greater detail below;

Packet Type identifies the type of data packet. For packet type, the following values are valid: ETX, EOT, ENQ, ACK and NAK. ETX (or "End of Text") is a one byte character code "03h" for indicating that the data packet is the first or middle packet of a command grater than 255 bytes. EOT (or "End of Transmission" is a one byte character code "04h" for indicating that the data packet is the last packet of a command greater than 255 bytes or the only packet of a command less than 255 bytes. ENQ (or "Enquiry") is a one byte character code "05h" used at the beginning of a link level session to determine when the receiver, either the system manager 22 or the system manager facility 34, is ready to receive packets. The ENQ packet is also referred to as the "attention packet". ACK (or "Acknowledgement") is a one byte character code "06h" used for positive acknowledgement of the receipt of a data or attention packet. Finally, NAK (or (Negative Acknowledge") is a one byte character code "15h" used for negative acknowledgement of the non-receipt of a data or attention packet; and CRC is a two-byte error check value generated from the standard CRC-CCITT 16 polynomial:

$$x^{16} \times x^{12} + x^5 + 1 \quad (01)$$

Included in the CRC calculation are the packet ID byte, all bytes in the variable length data except for any DLE bytes included therein and the packet type byte. Furthermore, neither the DLE byte preceding the packet type byte nor the CRC bytes transmitted as part of the packet is included in the CRC calculation.

The maximum size of the data component of the variable length data field is 255 bytes. As a result, command larger than 255 bytes must be transported in more than one packet. To do this, the ETX and EOT characters are used in the packet type field. The ETX character indicates whether the packet is a first or a middle packet composing a larger command while the EOT character indicates that the packet is the last packet comprising a larger command or the only packet of a command less than 255 bytes. Thus, the largest packet possible is 263 bytes+DLE's included in the variable length data field which are not included as part of the data component of the variable length data field.

Referring next to FIG. 5, the link layer protocol and method for asynchronous communications between the system manager 22 and the system manager facility 34 via the UART 92 shall now be described in greater detail. As described herein, the method for asynchronous communications is viewed from the perspective of the receiver of the asynchronous communication. It should be clearly understood, however, that, depending on the desired direction for communication flow, either the system manager 22 or the system manager facility 34 may be designated as the receiver and that the method described herein does not vary appreciably based upon the particular element designated as the receiver.

Commencing at step 200, a link between two communication elements, for example the UART 92 of the system manager 22 and the system manager facility 34, is established. More specifically, after a physical connection between the UART 92 and the system manager facility 34 has been established, both the UART 92 and the system manager facility 34 will begin sending out packets with a zero length data field and a ENQ [05h] in the packet type field. To determine whether the sending and receiving elements are ready for the transmission of data therebetween, both the UART 92 and the system manager facility 34 must each acknowledge receipt of the ENQ packet transmitted by the other, for example, by transmitting an ACK packet as more fully described below. Once the ENQ packets are acknowledge, ENQ transmissions stop and data packets may be transmitted between the two. Furthermore, the transmitted ENQ packets inform the receiver what the packet ID byte will be for the data packet which follows the ENQ packet. For example, if the packet ID field for the ENQ packet is 02h, the next packet sent will have a packet ID field of 03h. If, on the other hand, the respective acknowledgments of the ENQ packets are not received in 60 seconds, the link between the UART 92 and the system manager facility 34 is terminated.

Proceeding to step 210, the receiver commences polling for the SYN byte. Upon receipt of the SYN byte, the receiver knows that a data packet is being transmitted and will proceed to step 220. If any other byte than the SYN byte is received, the receiver will remain at step 210 and continue polling for the SYN byte.

At step 220, the receiver will commence polling for the DLE byte which flags those bytes which follow the DLE byte as being related to the communication of the data packet. If the DLE byte is received, then the receiver will known that a data packet is being transmitted. If any byte other than the DLE byte is received or if an interbyte timer set to timeout in one second times out without the receipt of a next byte, the receiver returns to step 210 to recommence polling for the SYN byte. Having received the DLE byte, the receiver will then begin polling for the STX byte which identifies the start of valid command data at step 230. As with the DLE byte, if any other byte other than the STX byte is received at step 230 or if the interbyte timer times out before receipt of a next byte, the receiver will return to step 210 to recommence polling for the SYN byte.

Having received the STX byte, the receiver initializes a CRC checksum to zero and, proceeding to step 240, will begins polling for the Packet ID byte, which, depending on the particular data packet of a sequence of data packets being sent, may range from 0 to FFh. Having received the packet ID byte, the CRC checksum is updated at step 250 with the received packet ID byte and the resultant CRC checksum saved. The receiver will then proceed to step 260 where it begins polling for a next byte. If, however, the interbyte timer times out without receiving the packet ID byte, the receiver will return to step 210 and recommence polling for the SYN byte. As indicated in the protocol for the data packet set forth in Table I, above, the bytes following the packet ID are data bytes although, as the length of the data portion of the packet is variable, the receiver will not know how many data bytes are to follow when the receiver begins to receive the data bytes.

Accordingly, at step 260, a next byte is received. In accordance with the method disclosed herein, it is specifically contemplated that byte received at step 260 shall be either a data byte or a DLE byte. If the next byte is a data byte, the data byte is part of a message being communicated and is, therefore, stored in a message buffer at step 270. The CRC checksum is then updated with the stored data byte at step 280 and the receiver then returns to step 260 to await a next byte. If, however, the next byte is a DLE byte, one of two conditions is indicated—either a DLE byte is also a data byte or the last data byte in the data packet has been transmitted. The method discards the received DLE byte without including the received DLE in the CRC checksum and proceeds to step 290 where the receiver polls for the next byte. If the next byte received is also a DLE byte, the second DLE byte is a data byte and is stored in the message buffer at step 270. The next DLE or data byte will then by used to update the CRC checksum at step 280 followed by the return of the receiver to step 260 to begin polling for the next byte. In the event that there is not enough buffer space to receive characters from the sender, the flow of data packets may be terminated. More specifically, if there is less than 4 Kbytes of buffer space available, the incoming data packet will neither be stored not ACKed. The timeout will expire and retransmission commenced. If, when the data packet is retransmitted, there is sufficient buffer space available, the data packet is stored and the retransmitted packet ACKed.

If, however, the byte received at step 290 is a packet type byte, the packet type byte is saved and the method proceeds to step 300 where the packet type byte is used to update the CRC checksum and, in the vent that the interbyte timer times out before the receipt of the byte at step 290, the receiver will return to step 210 and recommence polling for the SYN byte. Proceeding to step 310, the receiver begins polling for the least significant bit (or "LSB") of the CRC checksum. If the interbyte timer times out before the CRC LSB is received, the receiver returns to step 210 to recommence polling for the SYN byte. If, however, the CRC LSB byte is received before the interbyte timer times out, the receiver holds the CRC LSB and, at step 320, begins polling for the most significant bit (or "MSB") of the CRC. Again, if the interbyte timer times out before the CRC MSB is received, the receiver returns to step 210 to recommence polling for the SYN byte. Also, after transmitting the last CRC byte of the data packet, a retransmission timer is set for five seconds. If the retransmission timer expires before an acknowledgement is received (see below), the sender will retransmit the last packet. If, through a combination of NAKs and/or timeout, a sender attempts to send the same packet ten times and receives no ACK, the sender will terminate the link.

In the event that the CRC MSB byte is received before the interbyte timer times out, the receiver holds the CRC MSB and, at step 330, compares the held CRC2 to the updated CRC sum calculated from the received bytes. If the LSB and MSB of the received and summed CRCs are "bad", i.e. do not match, the receiver checks the packet type at step 340. If the packet type was not an ETX or an EOT byte, the receiver returns to step 210 to continue polling for the SYN byte. If the packet type was an ETX or EOT byte, the receiver sends a NAK signal to the sender at step 350 and returns to step 210 to continue polling for the SYN byte. The NAK or "negative acknowledgement" signal is a data packet with a zero length data field and a NAK [15h] for a packet type. The sender should ignore a NAK unless a complete data packet has been sent and should also ignore the packet ID field of the NAK data packet. Returning to step 330, if the LSB and MSB of the received and summed CRCs are "good", i.e. match, the receiver proceeds to step 360 where the packet ID byte previously received and stored is checked. If the received packet ID byte is "bad", i.e. is not identical to the known value that the packet ID byte should have (Recall that successive packet IDs are sequential in nature. Thus, any given value for a packet ID byte should be one greater than the value of the immediately prior packet ID byte.), the receiver disconnects at step 370. If the packet ID is good, i.e. if the value of the received packet ID byte is one greater than the value of the immediately prior packet ID byte or if the received packet ID byte is the first such byte received, the method proceeds to step 380 where the previously saved value for the packet type byte is checked.

If it is determined at step 380 that the previously received packet type byte indicates that the packet type is ETX, the received data packet is the first or middle packet of a command greater than 255 bytes. As the entire message has not yet been received, at step 390, it is determined that the receiver should continue receiving the current message. At step 400, therefore, the receiver sends an acknowledgment packet to the transmitter to acknowledge receipt of the data packet. The protocol for an acknowledgement packet uses a send-wait repeat scheme in which the sender transmitting a data packet waits for an acknowledgement of receipt of the data packet before transmitting another packet. The acknowledgement packet will be a packet with a zero length data field and an ACK [06h] for a packet type. After the sender receives an ACK packet with the correct packet ID, the sender can then transmit a next data packet and the receiver returns to step 210 to commence polling for the SYN byte of the next data packet. If a sender receives anything else as a response or times out waiting for a response, the last packet must be retransmitted.

Returning to step 380, if it is determined that the previously received packet type byte indicates that the packet type is EOT, the received data packet is the last packet of a command greater than 255 bytes or the only packet of a command less than 255 bytes. As the entire message has now been received, the completed message is delivered to the receiver at step 410 and the method returns to step 400 to send an acknowledgement packet such as that previously described to the sender.

Again returning to step 380, if it is determined that the previously received packet type byte indicates that the packet type is ENQ, the received data packet is a zero length data field attention packet typically used at the beginning of a link-level communication to determine when a receiver is ready to receive data packets from a sender. Upon determining that the received packet is an ENQ type packet, the method proceeds to step 420 where an acknowledgement packet such as those described with respect to step 400 is transmitted.

Still again returning to step 380, if it is determined that the previously received packet type byte indicates that the packet type is ACK, the received data packet is a zero length data field acknowledgement packet used to acknowledge successful receipt of a data or attention packet. Upon determining that the received packet is an ACK type packet, the method proceeds to step 430 where a next packet, either a packet of a next message if the ACK was sent in response to the receipt of an EOT type packet, a packet of the next message if the ACK was sent in response to the receipt of an ETX type packet or a first packet of a message if the ACK was sent in response to the receipt of an ENQ type packet, is transmitted by the sender. In turn, the receiver returns to step 210 to commence polling for the next SYN byte.

Returning yet again to step 380, if it is determined that the previously received packet type byte indicates that the packet type is NAK, the received data packet is a zero length data field acknowledgement packet used to acknowledge unsuccessful receipt of a data or attention packet. Upon determining that the received packet is a NAK type packet, the method proceeds to step 440 where the packet is retransmitted by the sender. The receiver will returns to step 210 to recommence polling for the SYN byte.

The method of the present invention, as described thusfar, presumes that the ACK packet sent by the receiver to acknowledge successful receipt of an ETX, EOT or ENQ packet type is always received by the sender. However, some ACK packets fail to be received by the sender. As a result, the receiver should be able to accept duplicate copies of the same packet transmitted sequentially and discard the duplicates after acknowledgement. For example, assume a sender transmits a packet with a packet ID of FAh. The receiver receives the packet and ACKs. However, the ACK is not received by the sender. Under these circumstances, the sender would timeout and retransmit packet FAh. In accordance with one aspect of the invention, the receiver will recognize the duplicate data packet when received, ACK receipt of the duplicate packet and discard it. Otherwise, multiple copies of the same data packet will be incorporated into the data received by the receiver.

The method of the present invention, as described thusfar, also presumes that only one ACK packet will be sent by the receiver for each data packet transmitted thereto. Under certain circumstances, however, multiple ACKs corresponding to the transmission of a single data packet may be generated by the receiver. For example, if the sender transmits a data packet, times out, and then transmits the packet again, the sender must handle multiple ACKs for that packet while waiting for an ACK for the next packet. For example, if a sender transmits packet 67h, times out and then transmits packet 67h a second time, the sender may receive an ACK for 67h and then transmit packet 68h. The receiver, however, may re-acknowledge packet 67h instead. This duplicate ACK must be thrown away. Furthermore, the difference in an ACK can never be greater than one back from the expected packet ID. For example, if the sender had sent 67h, received an ACK for it, sent 68h, received an ACK for it, and then sent 69h, the receipt of an ACK for 67h will cause termination of the link.

Having fully described the simultaneous, two-way asynchronous communications between the system manager 22 and the remote or out-of-band local system manager facility 34 via the UART 92 at the link level, the same will now be discussed at the application level. Communications at the application level are structured in a command/response configuration where each command has its own response and both the command and the response begin with the opcode for the command and a command tag bit relates a specific command to its response. To facilitate identifying it as a response, the MSB of the command field of the response is always set. Furthermore, unlike link level communications, as no command can be issued by both sides, the command itself identifies the transmitter and the receiver of that command.

Each command and command response is formatted in accordance with the application level protocol for the system manager 22. For transferring commands, the application level protocol is as follows:

TABLE II

Command (byte)
Command Tag (byte)
(unique fields) (described in greater detail later)

where:

Command is an 8-bit value which identifies the particular command type being transmitted; and Command Tag is an 8-bit value determined by the sender that identifies the specific occurrence of a command type being transmitted. The receiver should echo the value for the command tag. For transferring command responses, the application level protocol is as follows:

TABLE III

Command (MSB set) (byte)
Command Tag (byte)
Result Code (byte)
(unique fields) (described in greater detail later)

where:

Command is the 8-bit value identifying the command the command response is generated in response to. Unlike the command protocol, however, the high bit of the command response is set to indicate that it is a command response and not a new command;

Command Tag is an 8-bit value determined that identifies the specific occurrence of a command type being responded to. The command tag for the command response is identical to that for the corresponding command, thereby enabling the command tag to match a response message with the original command; and Result Code is an 8 bit value whose meaning varies in relationship to the context of command. If, however, a command cannot be processed by the receiver, the abort result code (02h) will be the value of the result code. Several command will have an additional byte assigned to this field to allow for extended result code reporting.

The following application level commands are used to transfer screen-orientated and object based information. The control commands are used to specify and establish modes of operation within the system manager 22. As noted below, only one of the listed control commands may be issued by the system manager. The remainder are issued by the system manager facility 34. For all of these commands, bits listed as "reserved" are set to 0. These commands and command responses are as follows:

1. Identify

Purpose:

The identify command is issued by the system manager 22 at the start of every communication session. No further communication exists between the system manager facility 34 and the system manager 22 until the application returns a successful response to this command and then issues the Activate Session command. Upon correctly matching the received password, the session is active.

Command Format:

```
Identify (01H) (byte)
Command Tag (byte)
Reserved (2 bytes)
Identify Flags (byte)
Identifier String (16 bytes)
Reserved (34 bytes)
``` where:

Identifier String is a null terminated ASCII string identifying the system manager 22 establishing the link.

Remote Response

```
Identify (81H) (byte)
Command Tag (byte)
Result Code (byte)
null-term. call back phone number (25 bytes)
```

Result Codes

0h = Success - Further remote communication is possible.

2h = Abort - Command either not supported or could not be processed.

Identify Flags

| Bit 1 | Bit 0 | Host Power Status |
|---|---|---|
| 0 | 0 | Reserved |
| 0 | 1 | Host powered normally |
| 1 | 0 | Host powered down normally (i.e. powered down with alerting disabled.) |
| 1 | 1 | Host powered down abnormally (i.e. powered down with alerting active.) |

| Bit 2 | | Reserved |
|---|---|---|
| Bit 3 | | 1 - Call back enabled |
| | | 0 - Call back disabled |
| Bit 5 | Bit 4 | Connect Type |
| 0 | 0 | Normal |
| 1 | 1 | Alert |
| 0 | 0 | Call back |
| 1 | 1 | Reserved |
| Bit 6 | | 1 - Voice Present |
| | | 0 - No voice |
| Bit 7 | | 1 - Internal Modem installed |
| | | 0 - No modem |

2. Activate Session

Purpose

The Activate Session command is issued by the system manager facility 34 to begin a communication session with the system manager 22. If the system manager facility 34 fails to satisfy the password lock three consecutive times during an established link, the board will return results code (06H), and on the third failure will hang up and disregard all invalid attempts for two minutes. Correct passwords will be accepted while the timer is active, but all invalid passwords will result in the board hanging up.

Remote applications should be written to insure this command is issued within 20 seconds upon successful completion of the identify sequence, whether the connection is initiated by the board or the remote.

Command Format

```
Activate Session (02H) (byte)
Command Tag (byte)
Reserved (byte)
Password (16 bytes)
Null-term. site phone num (25 bytes)
```

Board Response

```
Activate Session (82H) (byte)
Command Tag (byte)
Result Code (byte)
Extended Result Code (byte)
```

Result Codes

0h = Success - Further remote communication can now occur.

2h = Abort - Command either not supported or could not be processed.

6h = Access Violation - Password was incorrect.

7h = Fatal Violation - Consecutive count on received failed passwords exceeded. The system manager 22 disconnected the link.

Extended Result code

| Bit 0 | 1 - alerting enabled |
|---|---|
| | 0 - alerting disabled |
| Bit 1 | 1 - Identify mismatch |
| | 0 - Identify match to physical connection |
| Bit 7-2 | Reserved. |

3. Deactivate Session

Purpose

This command will have the same effect as when the remote connection with the system manager facility 34 is terminated, either via hang-up or cable disconnect. Its main purpose is to allow the system manager 22 to discern normal from anomalous disconnects for history logging.

If this command is issued while the system manager facility 34 is active, it will have the same effect as though the deactivate system manager facility 34 command had been issued first.

Command Format

| |
|---|
| Deactivate Session (03H) (byte) |
| Command Tag (byte) |

Board Response

| |
|---|
| Deactivate Session (83H) (byte) |
| Command Tag (byte) |
| Result Code (byte) |

Result Code

0h=Success - No more commands will be processed until the session is reactivated.

2h=Abort - Command either not supported or could not be processed.

4. Activate System Manager Facility

Purpose

The system manager facility 34 will issue this command to perform the console emulation. While not strictly a mode in itself, the system manager 22 will perform additional actions, such as initiating automatic screen updating, only while the remote console function is active. Also, all commands associated with the remote console function will return an error if received by the system manager prior to this function being activated.

The last parameters indicate the desired remote screen refresh intervals, which indicate the refresh frequency bounds to be followed. A zero in either of these fields effectively nullifies it; for example, if MAXIMUM REFRESH=0, the system manager 22 can wait indefinitely between screen updates if it hasn't detected any. If MINIMUM refresh is 0, the system manager 22 will not look for screen changes. If both are 0, then the system manager 22 will not refresh. If the system manager facility 34 can determine the maximum rate at which it can process screen updates, set the minimum accordingly.

If maximum refresh>0, then when the corresponding timer expires, the entire screen will be sent. Note that this can only happen if either the minimum refresh has been disabled or no changes have been detected within the specified interval. This feature provides a mechanism for an application to receive the entire screen at a specified rate, allowing for simplified screen refresh support.

If a smaller minimum refresh is specified than the system manager 22 can support, the system manager 22 will attempt to send screen change packets at the highest rate allowable within the operating limits of the board. Thus for applications wanting screen refreshes as fast as the system manager 22 can generate them, set minimum=1.

If automatic screen updating is enabled, the system manager 22 will send the entire screen as the first update after responding to this command.

The local console screen modes supported by the system manager 22 are VGA 80 column text. If a mode occurs that is not supported, the system manager 22 will notify the system manager facility 34 that screen information is not valid because current mode is non-text.

Command Format

| |
|---|
| Activate Remote Console (04H) (byte) |
| Command Tag (byte) |
| Console Flags (byte) |
| Minimum Refresh (msecs.) (2 bytes) |
| Maximum Refresh (msecs.) (2 bytes) |

Console Flags

| Bit 0 | 1 - Host keyboard unlocked during a session |
| | 0 - Host keyboard locked during a session |
| Bit 1-7 | Reserved |

Board Response

| |
|---|
| Activate Remote Console (84H) (byte) |
| Command Tag (byte) |
| Result Code (byte) |
| Keyboard Flags (byte) |

Result Codes

0h=Success - The system manager facility function is now active.

2h=Abort - Command either not supported or could not be processed.

4h=Process Failure - System manager facility 34 could not be activated by the system manager 22.

5h=Invalid Parameters - Refresh bounds out of acceptable limits for the system manager 22.

6h=Access Violation - Activate Session command not issued or properly completed first.

Keyboard Flags

| Bit | Set to: |
|---|---|
| Bit 0 | 1 - Scroll Lock is on at Host keyboard. |
| | 0 - Scroll Lock is off at Host keyboard. |
| Bit 1 | 1 - Numlock is on at Host keyboard. |
| | 0 - Numlock is off at Host keyboard. |
| Bit 2 | 1 - Caps Lock is on at Host keyboard. |
| | 0 - Caps Lock is off at Host keyboard. |
| Bit 3 | 1 - bits 0-2 reflect Host keyboard state. |
| | 0 - bits 0-2 are not valid. |
| Bit 4-7 | Reserved |

5. Deactivate System Manager Facility

Purpose

This command terminates all remote console activity. Performing this command will optimize the system manager's performance both internally and at the interface, as it ensures abortion of all internal monitoring/updating which may be running as part of the remote console function.

If a screen update is currently being sent by the system manager 22 to the system manager facility 34, it will not be aborted. The system manager facility 34 must be prepared to adjust timeout timers to accommodate this occurrence.

Command Format

| |
|---|
| Deactivate System Manager (05H) (byte) |
| Command Tag (byte) |

System manager Response

```
Deactivate System Manager (85H) (byte)
Command Tag (byte)
Result Code (byte)
```

Result Codes

0h=Success - The remote console function is now inactive.

2h=Abort - Command either not supported or could not be processed.

4h=Process failure - keyboard did not respond to reenable command.

6h=Access Violation - Activate Session command not issued or properly completed first.

The following system facility application level commands are used to support system manager facility activity. All of these commands are issued by the system manager facility except for screen update. These commands are only valid when the session is active. For all of these commands, bits listed as "reserved" are set to 0. These commands and command responses are as follows:

1. Reboot Computer System

Purpose

This command is used to re-boot the computer system from a remote location. The method field is used to specify whether a WARM (00H) or COLD (FFH) start will be performed.

While rebooting, strange characters may flash across the screen momentarily. These characters are caused because the system manager 22 is reading video RAM while being loaded with test patterns during the computer system.

Command Format

```
Reboot Computer System (06H) (byte)
Command Tag (byte)
Method (byte)
```

System manager Response

```
Reboot Computer System (86H) (byte)
Command Tag (byte)
Result Code (byte)
```

Result Codes

0h=Success - System manager is re-booting.

1h=Illegal - Remote Console Function is inactive.

2h=Abort - Command either not supported or could not be processed.

5h=Invalid Parameters - Requested method not supported.

6h=Access Violation - Activate Session command not issued or properly completed first.

2. Send Scan Code Sequence

Purpose

Use this command to type a scan code sequence at the system manager facility and insert the sequence at the computer system console's keyboard port. In the event of a transfer that only partially succeeded, the count field will indicate the number of scan codes successfully transmitted to the computer system by the system manager 22.

Command Format

```
Send Scan Code Seq. (12H) (byte)
Command Tag (byte)
<reserved> (byte)
<scan code sequence here>
```

System manager Response

```
Send Scan Code Seq. (92H) (byte)
Command Tag (byte)
Result Code (byte)
Count (byte)
```

Result Codes

0h=Success - Scan codes successfully transmitted via Host keyboard.

1h=Illegal - Remote Console function is inactive.

2h=Abort - Command either not supported or could not be processed.

4h=Process Failure - the system manager 22 correctly sent Only the first N scan codes, indicated by the Count parameter.

6h=Access Violation - Activate Session command not issued or properly completed first.

7h=Fatal Violation - Host keyboard is not in supported mode.

4. Screen Update

Purpose

This is a system manager 22 issued command which supports automatic screen transfers. When the system manager's automatic screen monitoring function is activated, screen updates will occur periodically to facilitate remote screen refreshing. The frequency of transmission can be controlled by parameters specified in the activate remote console command. More than one change from the current screen can be sent in this packet.

Protocol for Sending Screens to the Remote:

The screen is divided into cells which represent 8 character blocks on the screen. The Cell Value is the screen offset from the last active cell included in the response packet. When the screen comes back, do not assume that when the First Cell Value equals zero, this coincides with the top of the screen. The First Cell Value is determined by where the first change occurs relative to the Starting Offset. For example, if Starting Offset=2000 characters First change occurs=2008 character The First Cell Value will be 1 because the first changed occurred 8 characters (1 cell) after the starting offset. If the first change had occurred at 2000, the First Cell Value would be 0. If the change had occurred with the first 1999 characters, the system manager 22 will not notify you because your Starting Offset requests only those changes beginning at 2000.

The Cell Mask marks which character changed within the cell. The mask is organized with the most significant bit indicating the status on the lowest video location in the cell. For example, Mask=80H indicates that only the first video location in the cell changed.

Cursor information is returned with every response except graphic screens and no host power. The packet size for graphics screens and no computer system power is 3 bytes which includes command opcode, tag, and screen flags information.

The local console screen modes supported by the system manager 22 are VGA 80 column text. If a mode occurs that is not supported, the system manager 22 will notify the system manager facility 34 that screen information is not valid because current mode is non-text.

Command Format

```
Screen Update (31H) (byte)
Command Tag (byte)
Screen Flags (byte)
Cell Height (byte)
Cursor Row (byte)
Cursor Column (byte)
Cursor Type Low (byte)
Cursor Type High (byte)
Number of Cells N (2 bytes)
Cell 1 Offset (byte)
Cell 1 Mask (byte)
...
Cell N Offset (byte)
Cell N Mask (byte)
Screen Data - compressed
Screen Attributes - compressed
```

Remote Response

```
Screen Update (B1H) (byte)
Command Tag (byte)
Result Code (byte)
```

Result Codes

0h = Success - the system manager screen received all data correctly.

2h = Abort - the system manager packet could not be processed.

Screen Flags

| Bit | Set to: |
| --- | --- |
| Bit 0 | 1 - Color test mode is active. |
|  | 0 - Monochrome text mode is active. |
| Bit 1 | 1 - Attribute MSB is Blink. |
|  | 0 - Attribute MSB is intensity. |
| Bit 2 | 1 - Bits 0 and 1 are valid. |
| Bit 3 | 1 - Computer system power down. |
|  | 0 - Computer system power up. |
| Bit 4 | 1 - Cursor position is valid. |
| Bit 5 | 1 - 50 × 80 Mode |
|  | 0 - 25 × 80 Mode |
| Bit 6 | 1 - use cursor shape data |
|  | 0 - use default data |
| Bit 7 | 1 - Graphics mode. |
|  | 0 - Text mode. |

The following general active application level commands are those commands that can be issued without activating the system facility, but require that the session be activated. The alert and dormant voltage warning are issued by the system manager 22. All other General Active Commands are issued by the system manager facility 34. For all of these commands, bits listed as "reserved" are set to 0. These commands and command responses are as follows:

1. Send Object Msg

Purpose

This command provides the asynchronous alternative to the Bus master interface 78 for object access. The format for object commands is identical to what should appear in the computer system's command list when the same command set is being input from the bus master interface 78. The "error" field seen in the Bus master interface mailbox registers will correspond to the result code in the response shown below. This command should be used to transfer all explicit object-referencing commands and the alert command get alert log.

Command Format

```
Send Object Msg (17H) (byte)
Command Tag (byte)
<object command here>
```

System Manager Response

```
Send Object Msg (97H) (byte)
Command Tag (byte)
Result Code (byte)
Extended Result Code (byte)
<object response here>
```

Result Codes

0h = Success - Object command successfully executed. Response (if appropriate) follows.

1h = Illegal - Session has not been activated yet.

2h = Abort - Command either not supported or could not be processed.

4h = Process Failure - Object and/or attribute doesn't exist.

5h = Invalid Parameters - Command not supported by object manager.

6h = Access Violation - Activate Session command not issued or properly completed first.

10h-3Fh -

Result Code MSB

For object commands containing more than one referenced attribute, the code will be used to indicate the attribute which caused an error in the event one occurs. For other object/alert commands, this field is reserved.

2. Get Feature Settings

Purpose

This command returns the system manager 22 settings and the date the firmware was created. The month, day, and year are in BCD format.

Command Format

```
Get Feature Settings (42H) (byte)
Command Tag (byte)
```

System manager 22 Response

```
Get Feature Settings (C2H) (byte)
Command Tag (byte)
Result Code (byte)
Reserved (byte)
Month (byte)
Day (byte)
Year (byte)
System manager 22 Setting1 (byte)
System manager 22 Setting2 (byte)
```

System manager 22 Setting1:

| Bit | Set to: |
| --- | --- |
| Bit 0 | 1 - International Modem |
|  | 0 - U.S. Modem |
| Bit 1 | 1 - Modem installed |
|  | 0 - No modem installed |
| Bit 2 | 1 - Voice ROM installed |
|  | 0 - No voice ROM |
| Bit 3 | 1 - Async disabled |
|  | 0 - Async enabled |

-continued

| Bit | Set to: |
|---|---|
| Bit 4 | 1 - Alerting disabled |
|  | 0 - Alerting enabled |
| Bit 5 | 1 - Innate monitoring disabled |
|  | 0 - Innate monitoring enabled |
| Bit 6 | 1 - Battery disconnected |
|  | 0 - Battery connected; memory contents retained across power recycling |
| Bit 7 | 1 - Board's dormant mode enabled on next host power down |
|  | 0 - System manager 22 power managed normally |

System manager 22 Setting2:

| Bit | Set to: |
|---|---|
| Bit 0 | 1 - Remote console audible indicator disabled |
|  | 0 - Remote console audible indicator enabled |

Result codes

0h=Success - Get Feature Settings command successfully executed. Month, Day, and Year fields are valid.

1h=Illegal - Command byte given has not been defined.

5h=Invalid Parameters - Command is improperly formed.

6h=Access Violation - Activate Session command not issued or properly completed first.

9h=Configuration not valid - requested configuration data with no configuration loaded.

3. Feature Control

Purpose

This command tells the system manager 22 which features to enable or disable. Normally, this command is used to disable alerting when the computer system is going to cycle power. Each of the referenced features can be independently controlled as indicated.

Command Format

| Feature Control (49h) (byte) |
| Command Tag (byte) |
| Feature Flag1 (byte) |
| Feature Flag2 (byte) |

Feature Flag1

| Bit | |
|---|---|
| Bit 0 | 1 - Disconnect battery |
|  | 0 - Reconnect battery |
| Bit 1 | 1 - Disable asynchronous interface |
|  | 0 - Reenable asynchronous interface |
| Bit 2 | 1 - Disable alert processing for new alert logging |
|  | 0 - Reenable alert processing |
| Bit 3 | 1 - Disable innate object monitoring |
|  | 0 - Reenable innate object monitoring |
| Bit 4 | 1 - Enable Board's dormant mode on next host power down |
|  | 0 - Manage System manager 22 power normally. |
| Bit 5-7 | Reserved |

Bit 0: Resets to zero automatically when the first configuration is loaded. Bit 1, 2, 3: will retain their values across multiple power cycles if the battery is connected. Bit 4: When this bit is enabled and the host loses power, the system manager 22 begins operating on battery power. Once the system manager 22 enters battery mode (Reserve), instead of transitioning to Standby, the system manager 22 goes directly to Dormant Mode. While in this mode, the system manager 22 can only be re-activated with host power returning.

Feature Flag2:

| Bit 0 | 1 - Remote console audible indicator disabled. |
|---|---|
|  | 0 - Remote console audible indicator enabled. |

System manager Response

| Feature Control(C9h) (byte) |
| Command Tag (byte) |
| Result Code (byte) |
| Result Code MSB (byte) |

Result Codes

0h=Success - Command successfully executed.

1h=Invalid command - The command byte given is not defined.

2h=Abort - Command either not supported or could not be processed.

5h=Invalid Parameters - Command is improperly formatted.

6h=Access Violation - Activate Session command not issued or not properly completed first.

4. Self-Test Error Code

Purpose

This command can be issued to determine the state of the system manager 22 and exactly which, if any, subsystem thereof has failed.

Command Format

| Self-Test Error Code(4Bh) (byte) |
| Command Tag (byte) |

System Manager Response

| Self-Test Error Code(CBh) (byte) |
| Command Tag (byte) |
| Result Code (byte) |
| Reserved (byte) |
| Failed Test Status (2 bytes) |

Result Codes

0h=System manager 22 ok.

2h=Abort - Command not supported or could not be processed.

6h=Access Violation - Activate Session command not issued or not properly completed.

FFh Self-test error occurred, see failed test status for 8test summary.

Result Format

| Bit 0 | 1 - ROM Checksum failed. |
|---|---|
| Bit 1 | 1 - RAM test failed |
| Bit 2 | 1 - 80186 timer failed. |
| Bit 3 | 1 - Built-in modem failed. |
| Bit 4 | 1 - Direct connect interface failed. |
| Bit 5 | 1 - Real-time clock failed. |
| Bit 6 | 1 - Temperature and voltage sensor failed. |
| Bit 7 | 1 - DTMF failed. |
| Bit 8 | 1 - VSL failed. |
| Bit 9 | 1 - Host bus monitor failed. |
| Bit 10 | 1 - BMIC Failed. |
| Bit 11 | Battery is broken |
| Bit 12-15 | Reserved |

5. Dormant Mode Imminent Warning

Purpose

Dormant Mode Imminent Warning is issued by the system manager 22 when there is a guaranteed minimum 30 seconds of battery life left. To avoid using all of the reserve battery power available, disconnect the session after the host has powered down, otherwise the system manager 22 may disconnect during operation and change to Dormant mode because of battery exhaustion.

The Dormant Voltage Warning is the only warning that will be issued before battery life expires. Once issued, the system manager 22 will disconnect in 30 seconds.

Command Format

| |
|---|
| Dormant Voltage Warning (08H) (byte) |
| Command Tag (byte) |

Remote Response

| |
|---|
| Dormant Voltage Warning (88H) (byte) |
| Command Tag (byte) |
| Result Code (byte) |
| Reserved (byte) |

Result Codes

0h = Success - Command successfully executed.
2h = Abort - Command not supported or could not be processed.

6. Alert

Purpose

During the course of normal communication with the system manager 22, an alert may occur which needs to be inserted into the communication stream. This command furnishes that capability on behalf of the system manager 22.

Command Format

| |
|---|
| Alert (32H) (byte) |
| Command Tag (byte) |
| Alert Data Structure (64 Bytes) |

Alert Data Structure

| |
|---|
| Command (40h) (byte) |
| Object ID (4 bytes) |
| Instance (byte) |
| Attribute ID (byte) |
| Attribute type (2 bytes) |
| Voice Error message # (byte) |
| Object label (16 bytes) |
| Attribute label (16 bytes) |
| Class (4 bytes) |
| Date (3 bytes) |
| Time (3 bytes) |
| Current Value (4 bytes) |
| Limit Value (4 bytes) |
| Optional Value (4 bytes) |

Remote Response

| |
|---|
| Alert (B2H) (byte) |
| Command Tag (byte) |
| Result Code (byte) |
| Reserved (byte) |

Result Codes

0h = Accepted - Alert data received and processed.
2h = Abort - Command not supported or could not be processed.

Thus, there has been described and illustrated herein, a protocol for asynchronous data transfers between a remote or out-of-band local system manager facility and a system manager. However, those skilled in the art will recognize that many modifications and variations besides those specifically mentioned may be made in the techniques described herein without departing substantially from the concept of the present invention. Accordingly, it should be clearly understood that the form of the invention as described herein is exemplary only and is not intended as a limitation on the scope of the invention.

What is claimed is:

1. A method exchanging, at a link level, messages between a manager for a computer system and a remote facility asynchronously linked with said system manager, comprising the steps of:

polling for a first character code which identifies the start of a data packet containing a message therein;

upon receiving said first character code, polling for a communication control character code which indicates that a data packet communication character code for said data packet follows;

upon receiving said communication control character code, polling for a first data packet communication character code which identifies the start of valid command data;

upon receiving said data packet character code, polling for command data which identifies said data packet being transmitted;

upon receiving said command data which identifies said data packet being transmitted, polling for a first part of a variable length data signal, said variable length data signal comprised of a plurality of data characters and at least one communication control character code;

upon receiving, as said first part of said variable length data signal, a first one of said at least one communication control character codes, discarding said received communication control character code and polling for a next part of said variable length data signal;

upon receiving, as said first part of said variable length data signal, a first one of said plurality of data characters, storing said received data character and polling for a next part of said variable length data signal;

upon receiving, as said next part of said variable length data signal, a first one of said at least one communication control character codes, discarding said received communication control character code and again polling for a next part of said variable length data signal;

upon receiving, as said next part of said variable length data signal, a next one of said plurality of data characters, storing said received data character and again polling for a next part of said variable length data signal;

upon receiving, as said next part of said variable length data signal, a second one of said at least one communication control character codes, storing said received second communication control character code and again polling for a next part of said variable length data signal;

upon receiving, as said next part of said variable length data signal, a second data packet communication character code which indicates the type of data packet received, determining a CRC checksum for said received signals; and polling for a CRC checksum comparison signal for comparing to said determined CRC checksum.

2. A method for link level exchanges of messages according to claim 1 wherein the step of determining a CRC checksum for said received signals further comprises the step of determining said CRC checksum from said first and second received data packet character codes, said received data characters and said communication control character codes received as part of said variable length data signal but which were not discarded after receipt thereof.

3. A method exchanging, at a link level, messages between a manager for a computer system and a remote facility asynchronously linked with said system manager, comprising the steps of:

polling for a first character code which identifies the start of a data packet containing a message therein;

upon receiving said first character code, polling for a communication control character code which indicates that a data packet communication character code for said data packet follows;

upon receiving said communication control character code, polling for a first data packet communication character code which identifies the start of valid command data;

upon receiving said data packet character code, polling for command data which identifies said data packet being transmitted;

upon receiving said command data which identifies said data packet being transmitted, polling for a first part of a variable length data signal, said variable length data signal comprised of a plurality of data characters and at least one communication control character code;

upon receiving, as said first part of said variable length data signal, a first one of said at least one communication control character codes, polling for a next part of said variable length data signal;

upon receiving, as said next part of said variable length data signal, a second one of said at least one communication control character codes, storing said received second communication control character code and again polling for a next part of said variable length data signal;

upon receiving, as said next part of said variable length data signal, a second data packet communication character code which indicates the type of data packet received, determining a CRC checksum for said received signals; and polling for a CRC checksum comparison signal for comparing to said determined CRC checksum.

4. A method for link level exchanges of messages according to claim 3 and further comprising the step of:

upon receiving, as said first part of said variable length data signal, a first one of said plurality of data characters, storing said received data character and polling for a next part of said variable length data signal.

5. A method for link level exchanges of messages according to claim 4 and further comprising the step of:

upon receiving, as said next part of said variable length data signal, a next one of said plurality of data characters, storing said received data character and again polling for a next part of said variable length data signal.

6. A method for link level exchanges of messages according to claim 5 and further comprising the step of:

upon receiving, as said next part of said variable length data signal, a first one of said at least one communication control character codes, again polling for a next part of said variable length data signal.

7. A method for link level exchanges of messages according to claim 6 wherein the step of upon receiving, as said first part of said variable length data signal, a first one of said at least one communication control character codes, polling for a next part of said variable length data signal further comprises the step of:

discarding said received communication control character code.

8. A method for link level exchanges of messages according to claim 7 wherein the step of upon receiving, as said next part of said variable length data signal, a first one of said at least one communication control character codes, again polling for a next part of said variable length data signal further comprises the step of:

discarding said received communication control character code.

9. A method for link level exchanges of messages according to claim 8 wherein the step of determining a CRC checksum for said received signals further comprises the step of determining said CRC checksum from said first and second received data packet character codes, said received data characters and said communication control character codes received as part of said variable length data signal but which were not discarded after receipt thereof.

* * * * *